May 21, 1957  W. H. LONG  2,793,301
AUTOMATIC SHUT-OFF DEVICE
Filed July 26, 1954
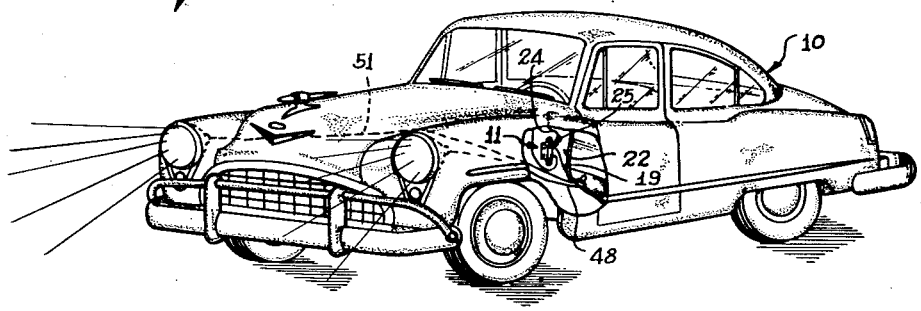
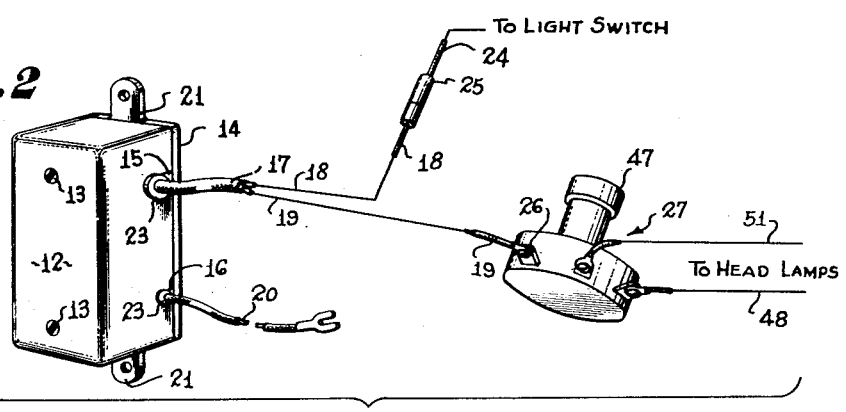
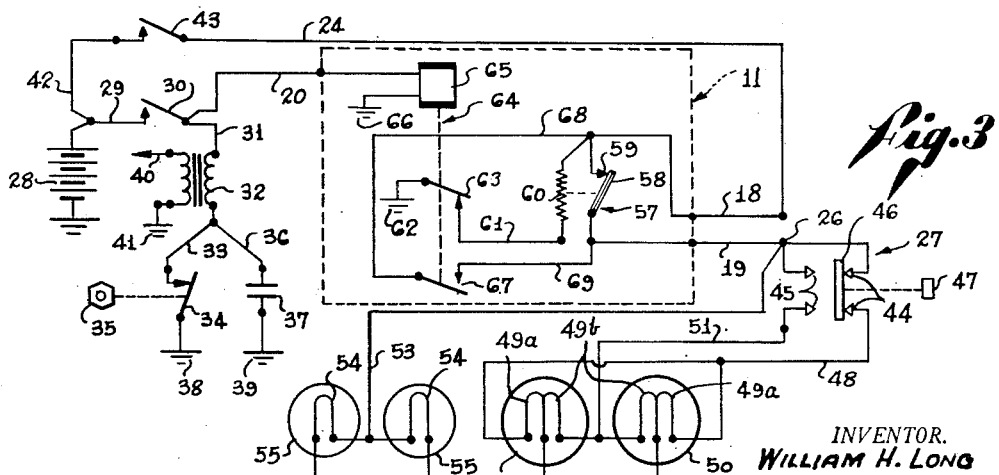
INVENTOR.
WILLIAM H. LONG United States Patent Office 2,793,301
Patented May 21, 1957

2,793,301

AUTOMATIC SHUT-OFF DEVICE

William H. Long, Pacific Palisades, Calif.

Application July 26, 1954, Serial No. 445,509

13 Claims. (Cl. 307—10)

The present invention relates to an automatic shutoff device and more particularly to an automatic shutoff attachment device for use with the electrical circuits of motor vehicles for preventing exhaustion of the vehicle battery in the event of a failure to disconnect one or more load circuits when the vehicle is parked.

In present motor vehicle lighting and other load circuits, there is no provision made for automatically turning off or de-energizing the lighting or other load circuits in the event such circuits are left energized after the vehicle has been parked. As a result, the vehicle storage battery frequently is exhausted because the operator has inadvertently left the load circuit energized after parking the vehicle. Such an unfortunate occurrence oftentimes happens when automobiles are parked at night in brightly lighted areas, or parked in the morning after a pre-dawn journey, the automobile headlights being unnoticed and left burning. With the car parked and no charging of the battery taking place, it requires only a few hours to exhaust a fully charged battery. The returning operator then faces the annoyance, difficulty and expense attendant upon starting a car with a dead battery.

A primary object of the present invention, therefore, is to provide a control device in a vehicle load circuit which is controlled by a switch in another circuit and which is effective to de-energize the load circuit a predetermined length of time after the other circuit is de-energized.

A further object of the present invention is to provide a control device for de-energizing one load circuit a predetermined length of time after de-energization of another circuit which provides for instantly restoring the load circuit to normal upon re-energization of the other circuit.

A still further object of the present invention is to provide an automatic shutoff device which is responsive to the ignition control switch of a vehicle for de-energizing a lighting circuit a predetermined length of time after the ignition system has been de-energized.

Another object of the present invention is to provide an automatic shutoff attachment device for installation in an automobile which is responsive to the de-energization of the ignition circuit for de-energizing the lighting circuit a predetermined length of time after opening of the ignition switch and which provides for instantly restoring the lighting circuit to normal upon the ignition circuit being re-energized.

Other objects and advantages of the present invention will be clearly evident to those skilled in the art upon perusal of the following description and the accompanying drawings, in which:

Figure 1 is a perspective view of an automobile showing the installation of a shutoff attachment device embodying the principles of the present invention, parts being broken away to show more clearly the installation;

Figure 2 is a perspective view of the attachment shown in Figure 1, indicating the connections to the electrical system of the vehicle; and Figure 3 is a wiring diagram showing the ignition and lighting circuits of an automobile with the components of the control device of the present invention, and the manner of their inter-connection.

Referring to the drawings, wherein a preferred form of the invention is shown, a motor vehicle such as an automobile 10 of any suitable or well known construction is shown as having installed thereon an automatic shutoff device 11 embodying the principles of the present invention. The individual components of the shutoff device 11, described in detail hereinafter, are enclosed by a cover 12 which is removably secured by means of cover screws 13 to a base 14. The cover 12 is slotted as at 15 and 16 and an electric cord or cable 17 having a pair of leads 18 and 19 extends from slot 15, and a lead 20 extends from slot 16, rubber grommets 23 being provided to protect the insulation. The base 14 is provided with a pair of mounting ears 21 which permit the shutoff device to be easily and conveniently mounted to a fire wall 22 or other conveniently located surface of the automobile 10.

To connect the shutoff device to control and load circuits such as the ignition and lighting circuits of the automobile 10, the lead 18 is connected to a light switch lead 24 by means of a connector 25 of any suitable or well known construction, lead 24 first having been disconnected from its former connection to a terminal 26 of a hi-lo switch 27. The lead 19 is then connected to the terminal 26 of the hi-lo switch 27, and the lead 20 is suitably connected to the ignition switch as will be more fully appreciated hereinafter. It will be seen that the installation of the shutoff device to the ignition and lighting circuits of an automobile is made extremely simple so that even the most mechanically unskilled purchasers can easily and conveniently install the shutoff device by following simple instructions.

Referring now particularly to Figure 3 of the drawings, the components of the shutoff device 11 and the internal connections are shown enclosed by the dashed lines 11. The apparatus and circuits outside the dashed line 11 comprise, in addition to the aforementioned conductors 18, 19 and 20, certain conventional motor vehicle electrical circuits. Such apparatus and circuits may include a battery 28 which constitutes the source of electrical energy for the ignition and lighting circuits of an automobile, as is conventional, the battery 28 normally comprising a storage battery of conventional construction. The conventional ignition circuit may include a lead 29 connecting one terminal of an ignition switch 30 to the battery 28, and a lead 31 connecting the other terminal of switch 30 to one terminal of an ignition coil 32. A lead 33 connects the other terminal of ignition coil 32 to a breaker point mechanism 34 which includes the usual cam 35 for well known purposes, and a lead 36 connects this same terminal of the ignition coil 32 to a suitable condenser 37, the breaker point mechanism 34 and the condenser 37 both being grounded as indicated at 38 and 39 respectively. The high tension terminal of the ignition coil 32 has a lead 40 extending therefrom to the distributor (not shown) and the other high tension terminal being grounded as indicated at 41.

The conventional lighting circuit, selected for illustration in Figure 3 as representative of load circuits generally, comprises a lead 42 which extends from battery 28 to one terminal of a light switch 43. The previously mentioned light switch lead 24 extends from the other terminal of light switch 43 and is normally connected to terminal 26 of hi-lo switch 27 in the manner previously described. The hi-lo switch 27 is of the single pole, double throw, contact maintaining, type and may include a foot-operated activating button 47. In one position of the switch, terminal 26 is connected through contacts 44, 46 and lead 48 to hi-beam filaments 49a of headlights 50 while in the other position, terminal 26 is connected through contacts 45, 46 and lead 51 to lo-beam filaments 49 of the headlights 50, the filaments 49a and 49b being grounded as indicated at 52. Filaments 54 of the tail lights 55 are conventionally connected to terminal 26 by conductor 53, the filaments 54 being grounded as indicated at 56.

The shutoff device of the present invention includes a normally closed time-delay relay 57, the normally closed contacts 58, 59 of which are connected in series in the lighting circuit, one of the contacts being connected by the previously mentioned lead 18 to light switch lead 24 and the other contact being connected by lead 19 to the terminal 26 of the hi-lo switch 27. The time delay relay 57 is preferably of the thermally actuated type including a heating element 60, in the form of a suitable resistor, positioned adjacent movable contact 58 which is formed as a bi-metalilc strip, the strip bending sufficiently to open contacts 58, 59 and break the lighting circuit a predetermined time after energization of heating element 60.

The heating element 60 is connected in a circuit extending from the lead 18, through the heating element 60 and by way of a lead 61 to ground as indicated at 62 through normally closed contacts 63 of a relay 64. The relay 64 may be of any suitable or well known construction providing independent normally open and normally closed contacts. The coil 65 of relay 64 is connected between ground as indicated at 66 and the ignition switch 30 by means of aforementioned lead 20 so that whenever the ignition switch 30 is closed, the coil 65 is energized and normally closed contacts 63 are opened to prevent energization of heating element 60. Thus, during normal operation, with the ignition switch 30 closed, the lighting circuit is completed through contacts 58, 59 of time delay relay 57 so that the tail lights and headlights may be energized in the usual manner by operation of light switch 53.

When the operator parks the automobile and turns off the ignition switch 30, the coil 65 of the relay 64 is de-energized to close normally closed relay contacts 63. If the operator has turned off the light switch 43, no further function results; but if the light switch 43 has been left on inadvertently, the heating element 60 is energized through the circuit extending from battery 28 through lead 42, light switch 43, leads 24 and 18, heating element 60, lead 61, and closed relay contacts 63 to ground at 62. When the bi-metallic strip 58 is sufficiently heated, contacts 58, 59 open to break the lighting circuit so that the headlights and tail lights are disconnected from the battery. It will be noted that when this condition results, the heating element 60 remains energized to keep contacts 58, 59 of the relay 57 in the open position.

The heating element 60 and the bimetallic strip 58 are so chosen that a period from 10 to 15 minutes is necessary for the heating element to heat the strip 58 sufficiently to so open the contacts 58, 59. The heating element 60 is designed to draw only a small amount of current, preferably not more than one-fourth ampere so as to have a negligible effect on the battery 28.

When the operator returns to the car and the ignition switch 30 is turned on, the coil 65 or relay 64 is immediately energized. Normally open contacts 67 of the relay 64 are connected in parallel with the time delay contacts 58, 59 in a supervening circuit comprising conductors 68 and 69 so that the energization of relay 64 closes the lighting circuit immediately and the headlights and tail lights are again energized. The opening of relay contacts 63 de-energizes heating element 60 to allow the bi-metallic strip to cool and resume its normal position closing contacts 58—59.

While the shutoff device has been described in its use for automatically de-energizing the lights of an automobile in the event the operator inadvertently forgets to open the light switch, it will be appreciated that a device embodying the principles of the present invention is effective for de-energizing any load circuit in response to control means in another circuit.

From the foregoing it will be seen that this invention provides an automatic shutoff device for use with the electrical circuits of motor vehicles which prevents inadvertent exhaustion of the vehicle battery by de-energizing the load circuits to which it is connected whenever the vehicle is parked. Attention is directed particularly to the use of the time-delay relay which permits energization of the load circuit for short periods of time even when the vehicle is parked. Thus, when the device is used to control the lighting circuits of automobiles, the lights may be turned on for 10 or 15 minutes for any desired purpose, and without turning on the ignition.

Particular attention is directed to the provision of the supervening circuit which restores the load circuit to normal instantly upon energization of the control circuit, even though the shutoff device has functioned to de-energize the load. It will be noted also that as an attachment, the shutoff device is of simple inexpensive construction and so arranged as to make installation a simple matter well within the ability of the ordinary operator.

It will be apparent to those skilled in the art that certain modifications and changes may be made with respect to the aforedescribed preferred embodiment without departing from the spirit of the invention, and the invention is not to be limited to the details illustrated and described, except as defined in the appended claims.

I claim:

1. A control device for use in combination with a load circuit, a source of electrical energy, a switch for connecting the load circuit to said source of electrical energy, a second circuit, and a switch for connecting said second circuit to said source of electrical energy, said control device comprising: a control means in said load circuit operable upon actuation to interrupt said load circuit; an actuating means responsive to de-energization of said second circuit for actuating said control means; a time delay means co-acting with said control means for delaying operation of said control means a predetermined time after actuation thereof; and means connected to said load circuit and co-acting with said control means and responsive to energization of said second circuit for restoring said load circuit to normal.

2. A control device for use in combination with a load circuit, a source of electrical energy, a switch for connecting the load circuit to said source of electrical energy, a second circuit, and a switch for connecting said second circuit to said source of electrical energy, said control device comprising: a control means in said load circuit operable upon actuation to interrupt said load circuit; an actuating means connected to said load circuit and responsive to de-energization of said second circuit for actuating said control means when said load circuit is energized; a time delay means co-acting with said control means for delaying operation of said control means a predetermined time after actuation thereof; and means connected to said load circuit and co-acting with said control means and responsive to energization of said second circuit for restoring said load circuit to normal.

3. A control device for use in combination with a load circuit, a source of electrical energy, a switch for connecting the load circuit to said source of electrical energy, a second circuit, and a switch for connecting said second circuit to said source of electrical energy, said control device comprising: a time delay relay including circuit breaker means connected in said load circuit operable upon actuation of said relay to interrupt said load circuit; means responsive to de-energization of said second circuit for actuating said relay to thereby interrupt said load circuit a predetermined time after actuation of said relay; and switch means connected to said load circuit in parallel with said circuit breaker and responsive to energization of said second circuit for restoring said load circuit to normal.

4. A control device for use in combination with a load circuit, a source of electrical energy, a switch for connecting the load circuit to said source of electrical energy, a second circuit, and a switch for connecting said second circuit to said source of electrical energy, said control device comprising: a control means in said load circuit operable upon actuation to interrupt said load circuit; a time delay means co-acting with said control means for delaying operation of said control means a predetermined time after actuation thereof; an actuating means including contacts arranged to close upon de-energization of said second circuit, said contacts being connected in circuit with said control means for effecting actuation of said control means upon de-energization of said second circuit; and means connected to said load circuit and co-acting with said control means responsive to energization of said second circuit for restoring said load circuit to normal.

5. A control device for use in combination with a load circuit, a source of electrical energy, a switch for connecting the load circuit to said source of electrical energy, a second circuit, and a switch for connecting said second circuit to said source of electrical energy, said control device comprising: a control means including a circuit breaker connected in said load circuit operable upon actuation of said control means to interrupt said load circuit; a time delay means co-acting with said control means for delaying operation of said control means a predetermined time after actuation thereof; actuating means including contacts arranged to close upon de-energization of said second circuit, said contacts being connected in circuit with said control means for effecting actuation of said control means upon de-energization of said second circuit; and means including contacts connected in parallel with said circuit breaker and arranged to close in response to energization of said second circuit for restoring said load circuit to normal.

6. An automatic shutoff attachment device for connection to an electrical system having a load circuit, a second circuit, and a source of electrical energy for said circuits, said attachment device comprising: a circuit breaker; connector leads connected to said circuit breaker and providing for connection of said circuit breaker between said source and said load circuit; actuating means operable to open said circuit breaker to thereby disconnect said load circuit from said source; time delay means coacting with said actuating means for delaying the opening of said circuit breaker a predetermined time after operation of said actuating means; an electrically sensitive operating means connected to operate said actuating means; and a control conductor connected to said operating means and providing for connection of said operating means to said second circuit, said operating means being responsive to de-energization of said control conductor for so operating said actuating means, whereby de-energization of said second circuit will, after said predetermined time, disconnect said load circuit from said source.

7. Attachment device according to claim 6 wherein said circuit breaker, actuating means, and time delay means together comprise a time delay relay having normally closed contacts arranged to open a predetermined time after energization of said relay.

8. An attachment device according to claim 7 wherein said operating means comprises an electromagnetic relay having normally closed contacts connected in circuit with said time delay relay.

9. An attachment device according to claim 7 wherein said time delay relay is of the thermal type including a heating element and a bi-metallic contact arm.

10. An attachment device according to claim 6 which includes a switch connected in parallel with said circuit breaker, and means responsive to energization of said operating means for closing said switch means.

11. An attachment device according to claim 7 wherein said electromagnetic relay includes normally open contacts connected in parallel with the normally closed contacts of said time delay relay.

12. An automatic shutoff attachment device according to claim 6 which is adapted for use on a motor vehicle wherein said load circuit comprises a lighting circuit and wherein said second circuit comprises an ignition circuit, said attachment device including an enclosure for supporting and enclosing said circuit breaker, actuating means, time delay means, and operating means; and including mounting means for securing said enclosure to said vehicle.

13. The combination with an electrical system for a motor vehicle having a load circuit, a source of electrical energy, a switch for connecting the load circuit to said source of electrical energy, an ignition circuit, and a switch for connecting said ignition circuit to said source of electrical energy, of a control device for interconnection with said load circuit and said ignition circuit for automatically de-energizing the load circuit a predetermined time after de-energization of said ignition circuit, said control device comprising a control means connected in said load circuit and operable upon actuation to interrupt said load circuit; an actuating means responsive to de-energization of said ignition circuit for actuating said control means; a time delay means co-acting with said control means for delaying operation of said control means a predetermined time after actuation thereof; and means connected to said load circuit and co-acting with said control means and responsive to energization of said ignition circuit for restoring said load circuit to normal.

References Cited in the file of this patent
UNITED STATES PATENTS 2,606,626    Meyer _____ Aug. 12, 1952